US012778084B2

(12) United States Patent
Bosnjak

(10) Patent No.: US 12,778,084 B2
(45) Date of Patent: Nov. 3, 2026

(54) DUAL RETRACTABLE PET LEASH WITH ABILITY TO SELECTIVELY CONTROL AND RESIST TANGLING OF LEASHES

(71) Applicant: Ivan Anthony Bosnjak, Youngstown, OH (US)

(72) Inventor: Ivan Anthony Bosnjak, Youngstown, OH (US)

( * ) Notice: Subject to any disclaimer, the term of this patent is extended or adjusted under 35 U.S.C. 154(b) by 72 days.

(21) Appl. No.: 19/215,775

(22) Filed: May 22, 2025

(65) Prior Publication Data

US 2025/0280797 A1 Sep. 11, 2025

(51) Int. Cl.
*A01K 27/00* (2006.01)

(52) U.S. Cl.
CPC .......... *A01K 27/004* (2013.01); *A01K 27/008* (2013.01)

(58) Field of Classification Search
CPC .................................................... A01K 27/004
See application file for complete search history.

(56) References Cited

U.S. PATENT DOCUMENTS 5,632,234 A 5/1997 Parker
7,980,202 B2 * 7/2011 Bentz .................. A01K 27/004 119/796
8,151,735 B1 * 4/2012 McCrocklin ......... A01K 27/003 119/796
9,016,242 B2 * 4/2015 Bentz .................. B65H 75/406 119/796
9,107,394 B2 * 8/2015 Geller ................. A01K 27/004
2006/0201449 A1 9/2006 DiDonato
2011/0067649 A1 * 3/2011 O'Brien ............... A01K 27/004 119/796
2011/0180017 A1 * 7/2011 Goldenberg ......... A01K 27/004 119/796
2011/0314638 A1 * 12/2011 Patt ...................... A01K 27/004 16/421
2014/0060455 A1 * 3/2014 O'Brien ............... A01K 27/004 119/796

OTHER PUBLICATIONS

Wigzi—2025 Edition, Wigzi,https://www.wigzi.com/.
Paws Republic The Freedom Leash 2 Headed Retractable Pet Dog Leash HTF Free Ship; Model:610417:https://www.ebay.com/itm/155907111947?msockid=38b60fc02bbb6a9e1a2b1a2f2a496bfc.
Alcott Adventure Retractable Leash,Pet Adventures Worldwide, First available: May 15, 2019,Alcott.

* cited by examiner

*Primary Examiner* — Timothy D Collins
*Assistant Examiner* — Brittany A Lowery

(57) ABSTRACT

A leash assembly for walking two pets is provided. The leash assembly includes a housing having a pair of spools to which leashes are secured. The housing includes a front panel rotatably connected to an outer tube. A right spool control tube is slidably nested within the left spool control tube, and the left spool control tube is slidably nested within the outer tube. The right spool control tube and left spool control tube is connected to a first control button and a second control button using brake rods. In operation, the control buttons, when pressed, pushes the spool control tubes forward, thereby disengaging locking protrusions of the spool control tubes engaged with one of notches of the spools. The control buttons, when released, retracts the right and left spool control tube backward, thereby reengaging the locking protrusions of the spool control tubes with one of the notches.

18 Claims, 10 Drawing Sheets

DUAL RETRACTABLE PET LEASH WITH ABILITY TO SELECTIVELY CONTROL AND RESIST TANGLING OF LEASHES

FIELD OF THE INVENTION

The present invention relates to pet leashes, and more particularly to a dual-retractable pet leash used in connection with walking multiple pets simultaneously. Specifically, the present invention relates to a dual retractable pet leash with the ability to selectively or simultaneously control multiple pets, resist tangling of leashes, and minimize the effect each pet may have on each other and the owner holding the leash system in the natural course of the invention's use.

BACKGROUND

Pets have become increasingly popular as companions for many people. However, just as people enjoy the companionship of pets, most animals also enjoy the companionship of humans. All pets require a certain amount of time and care on the part of the owner, with the time and care depending upon the species and size of the animal. In pets, many people own dogs, and in fact own multiple dogs. One of the necessities in owning such an animal is taking the dog for a walk. This usually entails the use of a leash, and when multiple dogs are owned, the owner must resort to either using more than one conventional leash or a leash specifically designed to handle more than one dog. While the owner may have an independent leash for each pet, this is somewhat redundant, the two pets will often attempt to act independently of one another in the outdoor environment. The owner of two pets who attempts to walk his or her pets using two leashes is often subjected to tugs and pulls in different directions as the owner attempts to control the two pets simultaneously.

Further, there exist leashes that help a pet owner to connect two pets and walk them; however, in such a leash system, a single strap flows out of the leash system that's then connected to two pets. When the pets try to walk or run independently then the two straps tied to the pets tangle. The pet owner then has to stop and manually remove the tangled straps. For example, Alcott ™ adventure retractable leashes sold on Amazon is a leash system with a single strap that winds or unwinds, and the single strap is connected to two dogs using an intermediary strap.

Additionally, many dual leash assemblies are known in the art, for example, the Dual Doggie leash assembly sold online at www.wigzi.com by Wigzi LLC of Washington D.C. is a dual leash having dual retractable leashes that spin relative to a handle to try to prevent the two leashes from tangling with each other. Freedom Leash, sold on ebay by Paws Republic is apparatus that discloses dual retractable leashes extending from a body that can spin to try to prevent the two leashes from tangling with each other.

U.S. Pat. No. 5,632,234 discloses a multiple pet leash assembly having a single leash running through a pulley with a handle to restrain the pulley and leash.

U.S. Pat. No. 9,016,242 discloses an apparatus for preventing the entanglement of a pair of lines fed from separate reels. U.S. Pat. No. 9,016,242 specifically discloses a multi-reel, line-handling apparatus that includes a housing, a shaft located within the housing, the shaft defining a shaft axis, a first reel located within the housing, the first reel rotatably mounted to the shaft about a first reel axis angled with respect to the shaft axis, and a second reel located within the housing, the second reel rotatably mounted to the shaft about a second reel axis angled with respect to the shaft axis. The first reel and the second reel can be rotatable with respect to the housing about the shaft axis. Each of the pets can be restrained independently by actuating the appropriate brake rod trigger. Actuating the inner brake rod trigger locks the first reel assembly, thus restraining the pet(s) on the first leash. Actuating the outer brake rod trigger locks the second reel assembly, thus restraining the pet(s) on the second leash. Each of the reel assemblies can be locked or unlocked independently. Locking one reel assembly has no effect on the other reel assembly and no effect on the rotation of the sub-assembly. Thus, either of the pets, all the pets, or neither pet, can be restrained while at the same time maintaining free rotation of the rotatable sub-assembly to permit automatic uncrossing of the leashes.

U.S. Patent Publication No. 20060201449 discloses a no-tangle two dog retractable leash with a flashlight. The device includes a housing containing a pair of spools, each having a leash secured thereto. The spools rotate about an axle to allow each leash to unwind from, or rewind onto, its respective spool. Both ends of the axle are attached to the housing, thereby fixing the axle in place inside the housing. A handle is attached to the housing by a shaft that allows the handle to pivot with respect to the housing about an axis extending transversely to the axle. Since the axle is fixed in place inside the housing, when one leash crosses over the other leash, the housing rotates with respect to the handle (held stationary in a user's hand) in order to uncross the leashes from one another. The rotation of the housing with respect to the handle in order to uncross the leashes detracts from the operation of the device. The no-tangle two dog retractable leash of US20060201449 also includes a brake pad that can be operated by a user by pressing a push pad. The brake pad is arranged to simultaneously engage both spools when the user presses the push pad, thereby stopping both spools simultaneously. This arrangement prevents the user from stopping one spool independently from the other.

Although several solutions in the form of dual leash apparatuses exist to prevent tangling of the two leashes during use, most of these apparatuses use complicated mechanisms for individual control of two spools with leashes for restraining the pets. These apparatuses usually employ two trigger buttons, each configured for controlling leashes on the spools. Upon selectively pressing these trigger buttons, the leashes are locked, preventing unwinding of the leashes, and depressing the buttons allows the leashes to unwind from the spools. In contrast, the present invention is directed towards a novel and more reliable dual retractable pet leash with the ability to selectively control unwinding or locking of the leashes and resist tangling of the two leashes.

SUMMARY

It is an object of the present invention to provide a dual leash system with two control buttons, each control button configured to control the rotation of a spool carrying a leash. In the present invention, upon pressing a control button, the respective spool is unlocked to rotate and allow unwinding of the leash out of the unlocked spool.

It is an objective of the present invention to provide a dual retractable pet leash for walking or exercising two household pets (e.g., dogs), simultaneously.

It is another objective of the present invention to provide a dual retractable pet leash having an integral light.

It is another objective of the present invention to provide a dual retractable pet leash having an integral poop bag container.

It is another object of the present invention to provide a dual pet leash that is particularly adaptable for use with dogs, although it may be used with other animal species as well, for walking or otherwise restraining the pets as desired.

It is an object of the present invention to provide a dual retractable pet leash designed such that the leashes are individually controllable and automatically retract into the housing after the leashes are extended from the housing.

It is an object of the invention to provide a dual leash system with improved elements and arrangements thereof for the purposes described, which may be less complex, inexpensive, dependable, and fully effective in accomplishing its intended purposes.

Embodiments of the present invention discloses a dual-retractable pet leash assembly adapted for walking and restraining two pets. The dual-retractable pet leash assembly includes a housing comprising a front main body portion (102), and a rear handle portion with an opening to allow gripping of the rear handle portion.

In an embodiment, the housing (101) comprises a right spool, and a left spool rotatably disposed within the front main body portion of the housing. The right spool and the left spool having a first leash, a second leash secured thereto.

In an embodiment, the housing comprises a front panel integrated with a first bearing wheel rotatably connected to an outer tube residing within the housing.

In an embodiment, the housing includes a right spool control tube, and a left spool control tube. The right spool control tube slidably nested within the left spool control tube, and the left spool control tube is slidably nested within the outer tube. The right spool control tube is connected to a first control button using a first brake rod, and the left spool control tube is connected to the second control button using a second brake rod.

In an embodiment, the first control button, when pressed, pushes the right spool control tube forward, thereby disengaging a second locking protrusion of the right spool control tube engaged with one of a plurality of notches of the right spool, and the first control button, when released, retracts the right spool control tube backward, thereby reengaging the second locking protrusion of the right spool control tube with one of the plurality of notches.

In an embodiment, the second control button, when pressed, pushes the left spool control tube forward, thereby disengaging a first locking protrusion of the left spool control tube engaged with one of the plurality of notches of the left spool, and the second control button, when released, retracts the left spool control tube backward, thereby reengaging the first locking protrusion of the left spool control tube with one of the plurality of notches.

These and other features and advantages of the present invention will become apparent from the detailed description below, in light of the accompanying drawings.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The following description is of exemplary embodiments of the invention only and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms, and the like, and still fall within the scope of the present invention. Thus, the detailed description herein is presented for purposes of illustration only and not for limitation.

Reference in the specification to "one embodiment" or "an embodiment" is intended to indicate that a particular feature, structure, or characteristic described in connection with the embodiment is included in at least one embodiment of the invention. The appearances of the phrase "in one embodiment" or "an embodiment" in various places in the specification do not necessarily all refer to the same embodiment.

The dual-retractable pet leash and method of operating the same will now be described with reference to accompanying drawings, particularly FIGS. 1-15.

Referring to FIGS. 1-4, a dual-retractable pet leash 100 is provided. The dual-retractable pet leash 100 will hereinafter be referred to as a "leash assembly 100". The dual-retractable pet leash 100 is ideally configured for walking two pets together (E.g. dogs). However, it should be understood that even though the leash assembly 100 is meant to walk and restrain two pets, it can be used for just walking a single pet as well.

Figure 2:
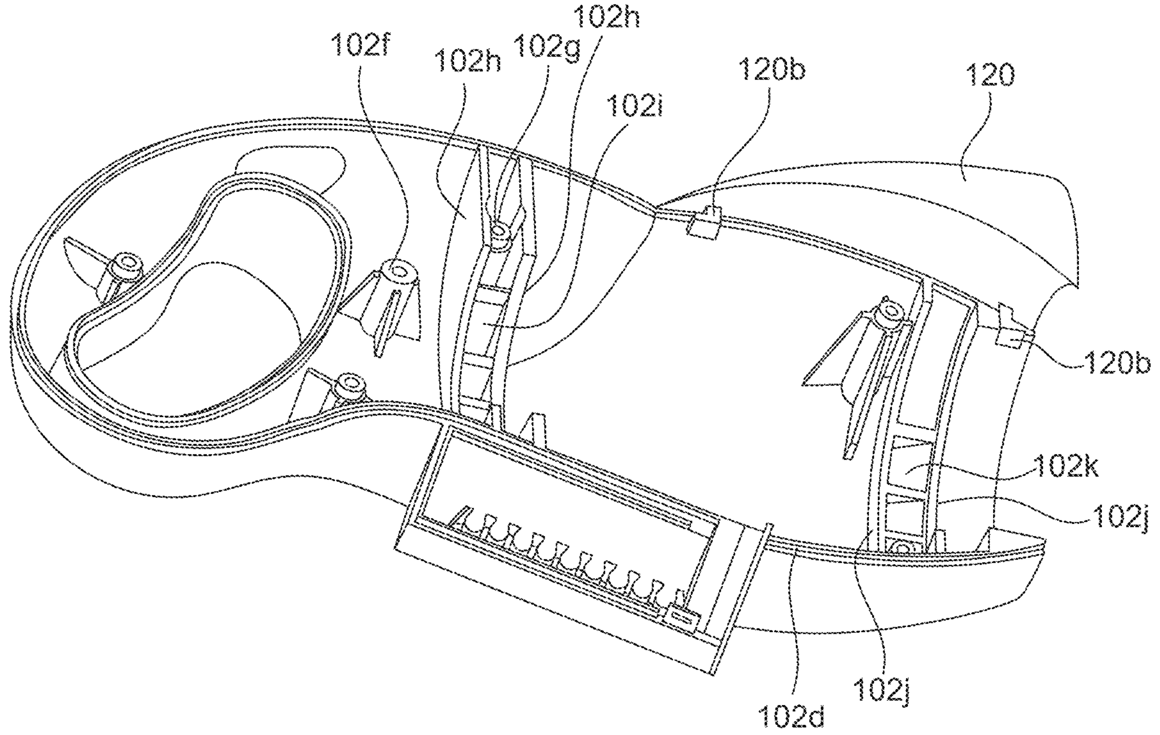
FIG. 2 is a left section of a housing of the dual retractable pet leash of FIG. 1, according to an embodiment.
Figure 3:
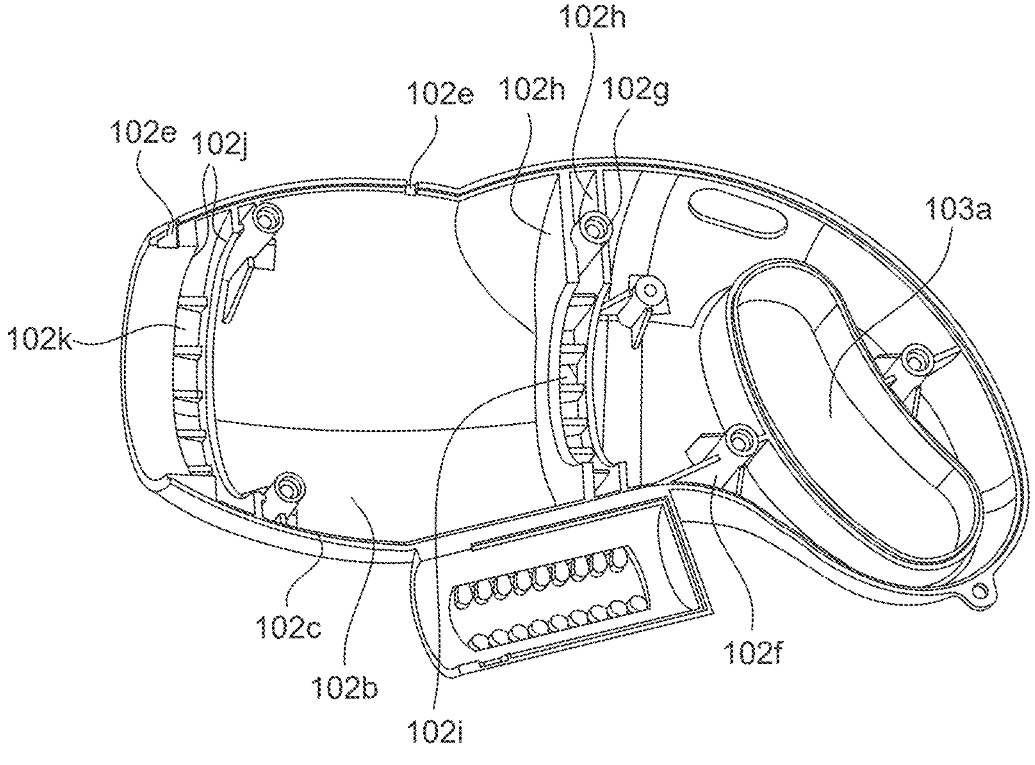
FIG. 3 is a right section of a housing of the dual retractable pet leash of FIG. 1 without an integral light for clarity, according to an embodiment.

The leash assembly 100 includes a housing 101. The housing 101 comprises a front main body portion 102, and a rear handle portion 103 with an opening 103*a* for a user's hand for gripping the leash assembly 100. In the preferred embodiment, the front portion 102 and the rear handle portion 103 are integrally connected as a single unit, in the form of a single mold. In another embodiment (now shown), the front portion 102 and the rear handle portion 103 may be detachably connected using suitable connecting means such as notches. Further, the housing 101 may be formed using two sections (a left section 102*a*, and a right section 102*b* as shown in FIGS. 2-3) that removably engage with each other. The two sections 102*a*, 102*b* are preferably symmetrical halves. The right section 102*b* and the left section 102*a* include interlocking features 102*c*,102*d* along their edges to removably connect the two sections 102*a*,102*b* together. The two sections 102*a*,102*b* may comprise additional engaging provisions 102*f* for coupling the two sections together using screws. Although only one such provision is shown numbered in FIG. 2, it should be understood that there may be 4-5 such provisions to tightly couple the two sections 102*a*,102*b* together. Additionally, there may be one or more positioning pillars 102*g* configured on each of the sections 102*a*,102*b* to reinforce the housing 101. In another embodiment, the two sections 102*b*,102*a* may be molded together as a single molded housing 101. The housing 101 may be made using a suitable plastic, shock-proof, anti-crack, ABS material that may be rigid and durable.

Figure 1:
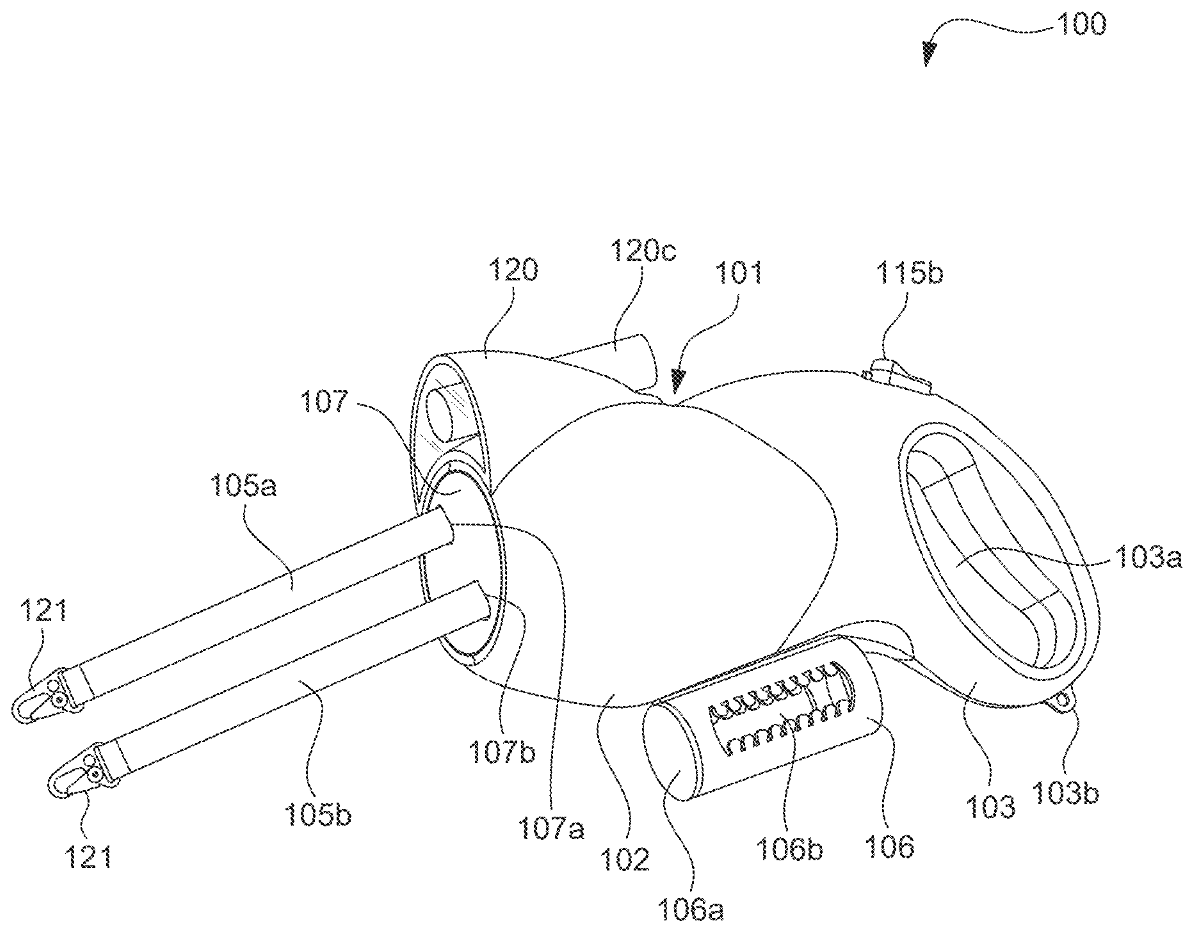
FIG. 1 is a dual retractable pet leash for walking two pets, according to an embodiment of the present invention.

In an embodiment, as seen in FIG. 1, the dual-retractable pet leash 100 further comprises an integral light 120. The light 120 is preferably an LED flashlight capable of illuminating several feet (E.g., 12 feet to 20 feet) distance for increasing visibility during nighttime walks. The flashlight 120 may include a press/depress button or any other mechanical button 120*c* to trigger the LED to switch on or off. The flashlight 120 may be removably attached to the housing 101. Specifically, the flashlight 120 may be removably attached to the top of the front main body portion 102 of the housing 101. The flashlight 120 may be attached on top of the front main body portion 102 using a snap-fit mechanism or any other similar mechanism that serves the purpose. The body of the flashlight 120 may be made using an 80-degree TPE soft rubber or any other suitable soft material. The bottom 120*a* of the flashlight 120 includes one or more locking features 120*b* that snap fit into one or more grooves 102*e* located on the front main body portion 102 of the housing 101 to lock the flashlight 120 over the front main portion 102.

In an embodiment, as seen in FIG. 1, the dual-retractable pet leash 100 further comprises an integral poop bag container 106. The poop bag container 106 is configured for holding one or more pet poop bags (not shown). The user can make use of these poop bags while walking the pets for collection and disposal of pet's poop at appropriate location. The poop bag roll can be refilled in the container 106 by simply opening a lid 106*a* of the poop bag container 106. The poop bag container 106 may be provided with at least one opening 106*b* to allow accessibility to the poop bags within the poop bag container 106. The integral poop bag container 106 may be formed as an integral part of the housing 101 (as a single mold) located at the bottom of the housing 101. In an alternative embodiment, the poop bag container 106 may be removably attached onto the housing 101 similar to the flashlight 104. In an example, the poop bag container 106 may be snap fitted onto the housing 101. The poop bag container 106 may be disposed at any other locations.

The housing 101 may further include a connecting tab 103*b*. The connecting tab 103*b* includes an opening to facilitate connecting various accessories such as for example, a retractable key chain for holding keys, any hanging tags and so on. The connecting tab 103*b* may be located at any suitable location on the housing 101. In the example embodiment, the connecting tab 103*b* is shown configured at the bottom of the handle 103, however, it may be possible that the connecting tab 103*b* may be configured at any other locations.

Figure 4:
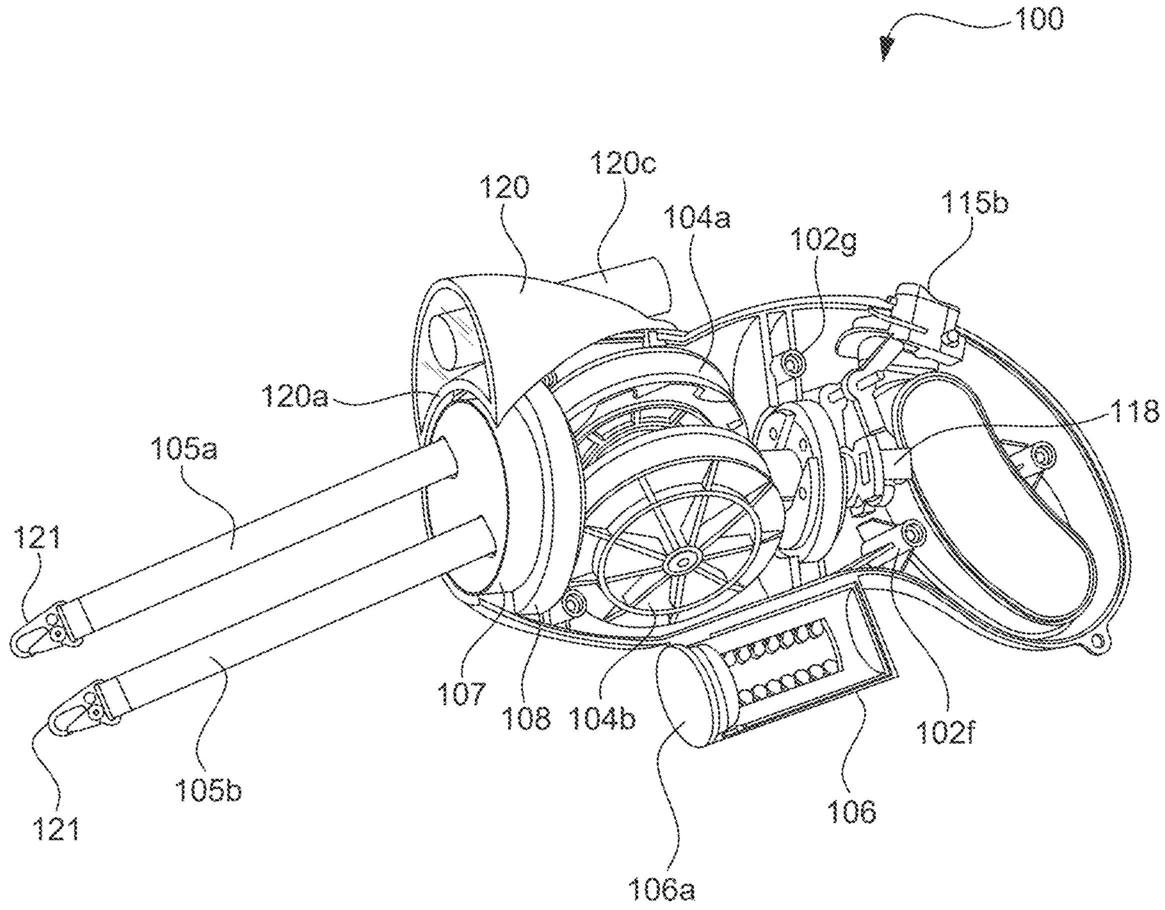
FIG. 4 is the dual retractable pet leash of FIG. 1 with the integral light and the left section removed, shown for clarity on internal components that reside within the housing, according to an embodiment.
Figure 5:
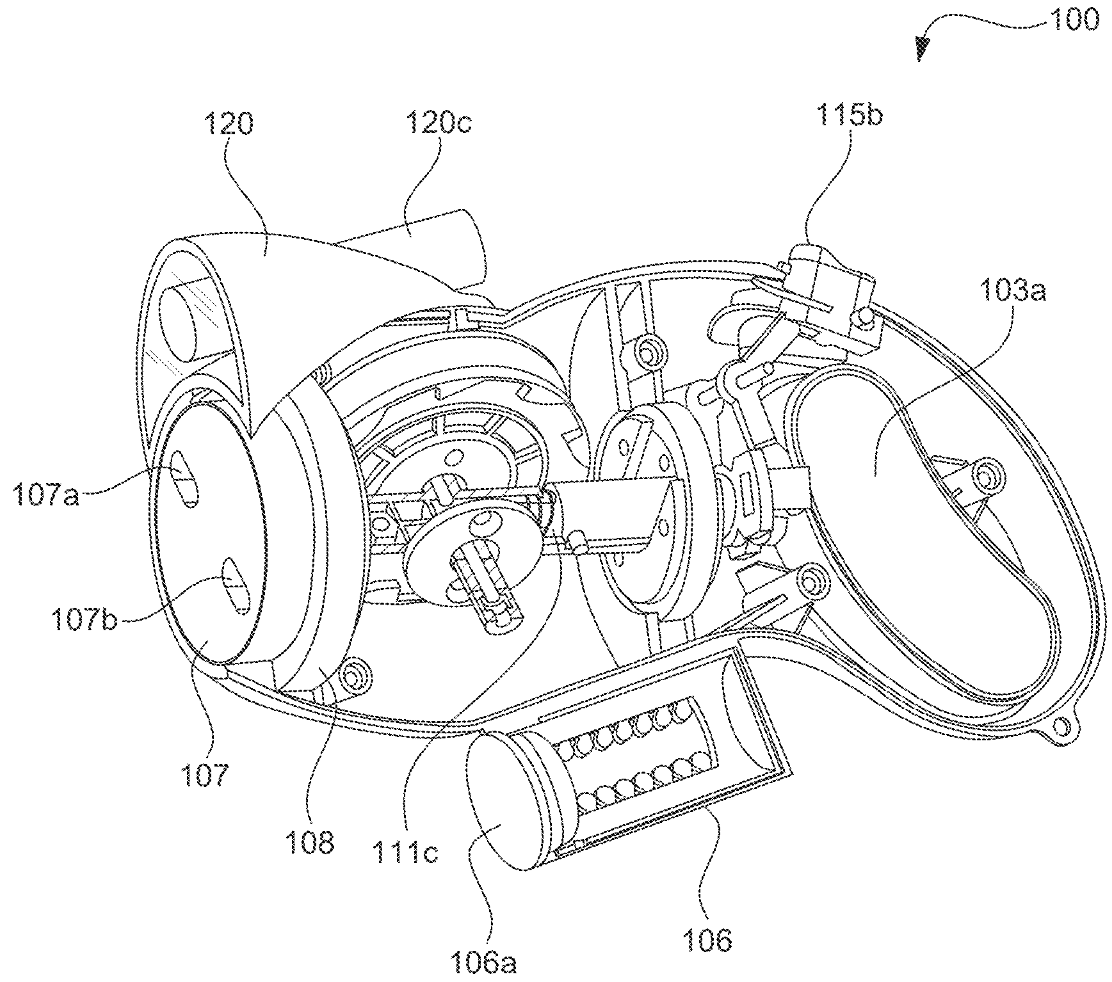
FIG. 5 is the dual retractable pet leash of FIG. 4 with a cross-sectional view of a portion of an outer tube, and a left spool or reel removed, shown for clarity on how the spools are mounted on their respective axles, according to an embodiment.
Figure 6:
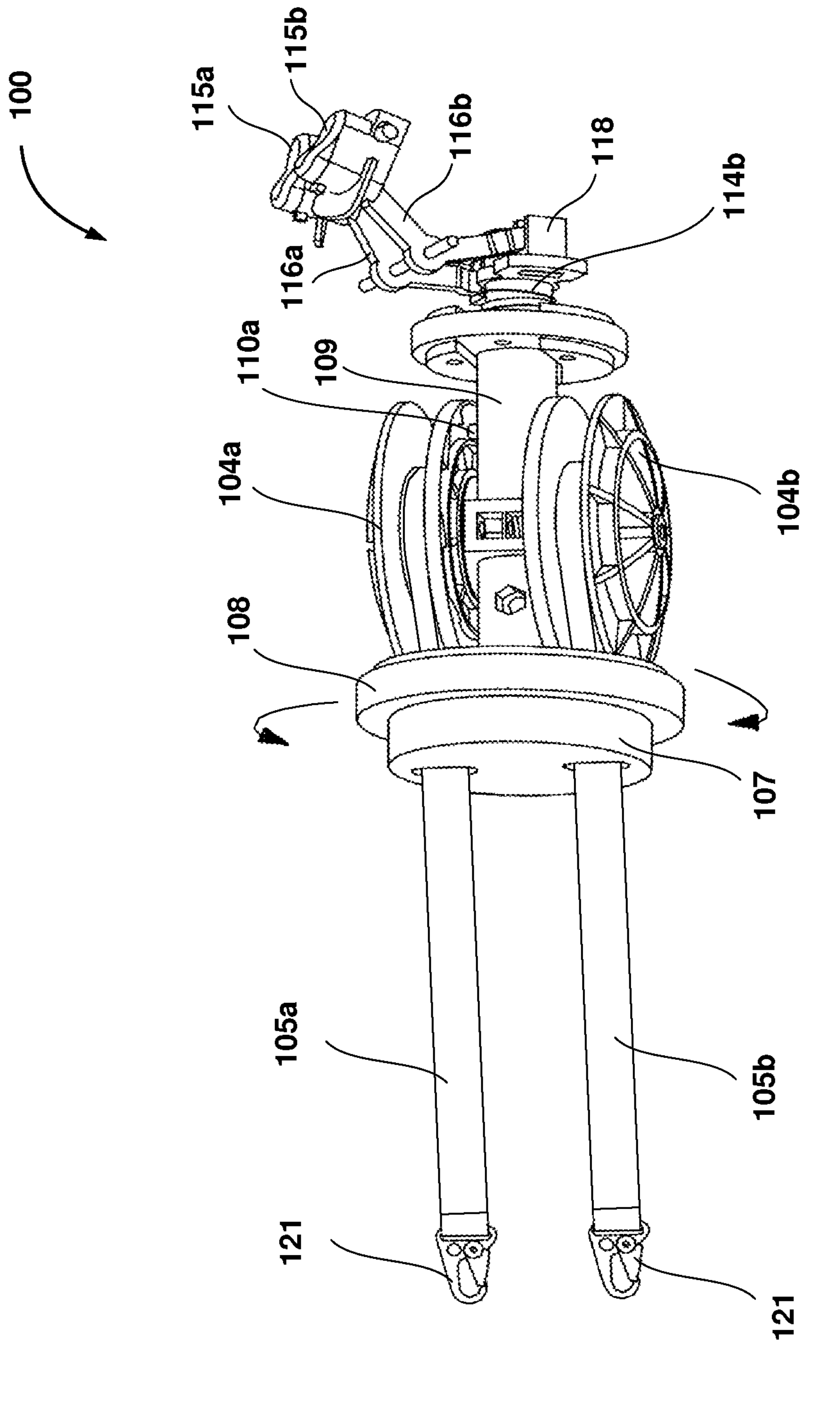
FIG. 6 is a perspective view of the dual retractable pet leash of FIG. 1 taken without the housing, the integral light, the poop bag container and just showing the major components that reside within the housing as well as some components such as control buttons that reside outside the housing.
Figure 7:
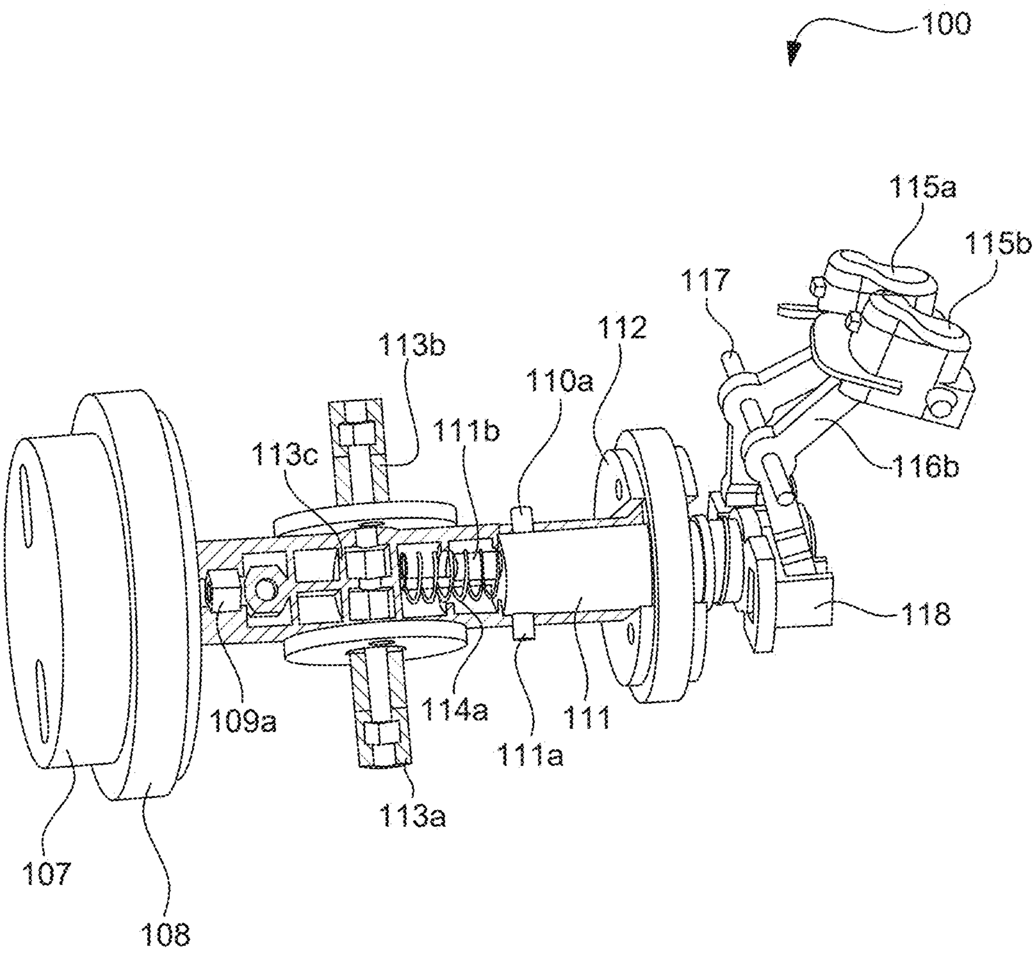
FIG. 7 is the dual retractable pet leash of FIG. 6 with a cross-sectional view of a portion of the outer tube, and the two spools mounted on their respective axles removed, shown for clarity of internal components and their configuration that extend within the outer tube, according to an embodiment.
Figure 8:
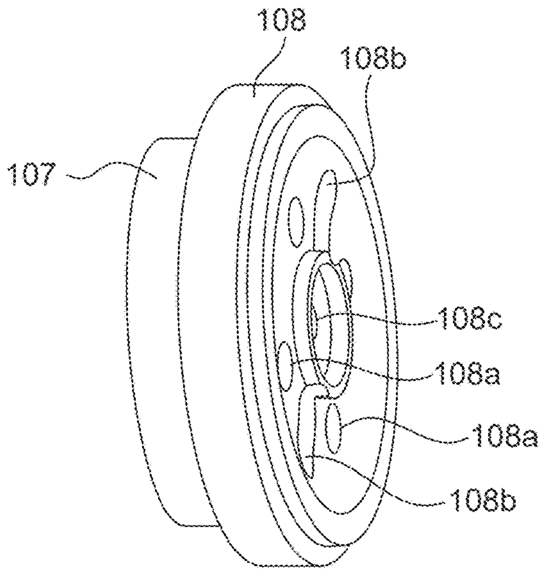
FIG. 8 is a perspective view of a faceplate with an integrated bearing assembly through which the leashes pass, according to an embodiment.

Referring to FIG. 4 in conjunction with FIGS. 5-7, major components that reside within the housing 101, as well as components such as control buttons that reside outside the housing 101 are shown. The description below will focus on various components that reside within the housing 101, their interconnections, and functionality. As seen, the internal space within the housing 101 is kept sufficient to allow mounting of different components strategically within the housing 101.

As seen, a front panel 107 integrated with a first bearing wheel 108 (also referred to as "front panel and first bearing wheel assembly 107,108" is configured at a distal end of the housing 101. The front panel 107 contains a first leash passage 107*a* and a second leash passage 107*b*, through which passes a first leash 105*a* and a second leash 105*b*. These leashes 105*a*,105*b* can be made of any material useful for leashing pets and that can be wound around leash spools 104*a*,104*b*. The leashes 105*a*,105*b* may include a carabiner 121 or similar connectors connected to its free end that may couple to the clip or coupler located on the collar or harness of a pet. The bearing wheel 108 also contains similarly sized and appropriately aligned passages 108*b*. The leashes 105*a*, 105*b* wound around spools (a right spool 104*a*, and a left spool 104*b*) are inserted through bearing passages 108*b* located on the bearing wheel 108 and finally passed out of the first leash passage 107*a* and the second leash passage 107*b* for connecting them to pets intended for walking. The bearing wheel 108 is embodied within a groove 102*k* formed by a pair of first supporting members 102*j* to prevent dislodgement of the front panel 107 and the first bearing wheel 108 assembly. The front panel 107 is connected to the bearing wheel 108 using fasteners such as screws through the slots 108*a* located on the bearing wheel 108 as may be understood from FIG. 8. The bearing wheel 108 spins within the groove 102*k* (which in turn spins/rotates the front panel 107 connected to the bearing wheel 108), this allows the entire mechanism for locking/unlocking the spools 104*a*, 104*b* to rotate/spin internally (as indicated by arrows in FIG. 10) when the two pets cross one another's paths while walking. This prevents the tangling of two leashes 105*a*, 105*b*. The rotational operation of the bearing wheel 108 is further supported by a second bearing wheel 112 located within the housing 101. The second bearing wheel 112 is embodied within a groove 102*i* formed by a pair of second supporting members 102*h* to prevent dislodgement of the second bearing wheel 112 from its position.

The housing 101 further includes an outer tube 109. The proximal end of the outer tube 109 is connected to the bearing wheel 108 using a fastener (not seen) that passes through a fastening hole 108*c* on the bearing wheel 108 and a hole 109*a* located inside the outer tube 109. The outer tube 109 comprises a first slot 109*b* and a second slot 109*c* on its external surface.

Figure 9:
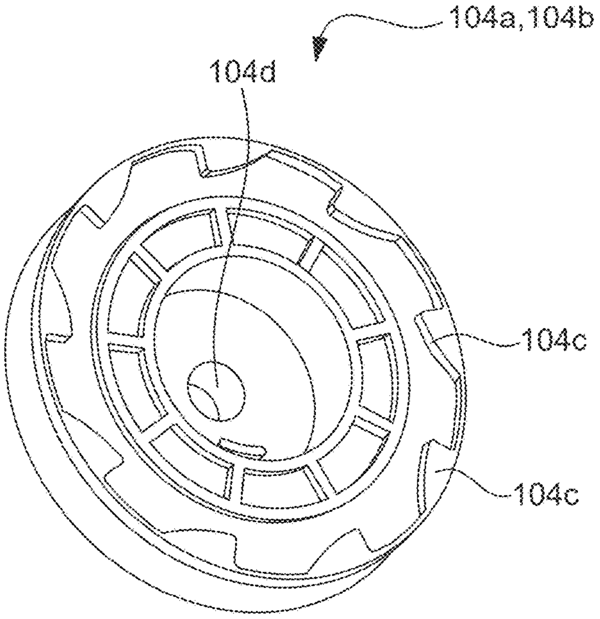
FIG. 9 is a perspective view of an exemplary spool or reel mounted on axles configured on the sides of the outer tube located within the housing, according to an embodiment.
Figure 10:
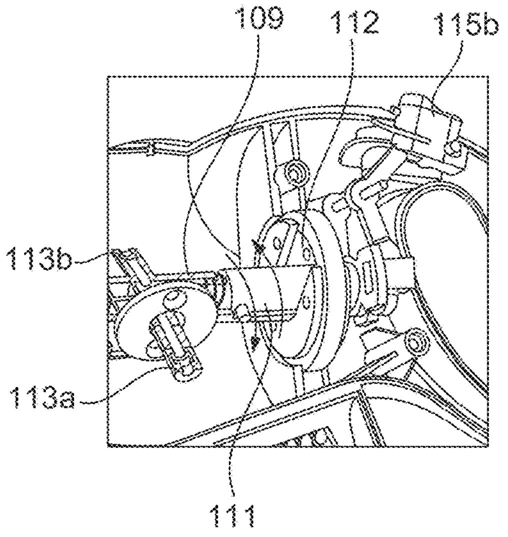
FIG. 10 is a sectional view of some of the major components that reside within the housing, specifically showing how detangling of the leashes is prevented in the natural course of the invention's use, according to an embodiment.
Figure 11:
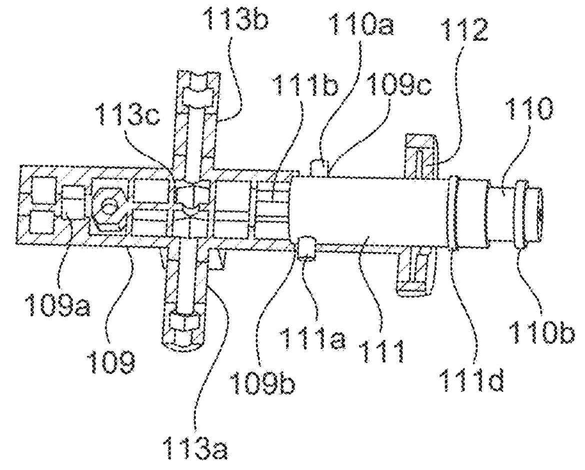
FIG. 11 is a partial sectional view of the outer tube with the two axles protruding from its sides, and a right spool control tube and a left spool control tube are shown nested within the outer tube.

A pair of spools, namely a right spool control tube 110 and a left spool control tube 111 are slidably nested within the outer tube 109. In an embodiment, right the length of the spool control tube 110 is greater than the length of the left spool control tube 111. The length of the outer tube 109 is ideally longer than the length of the right spool control tube 110 and the left spool control tube 111. FIG. 11 more specifically shows this nesting of the right spool control tube 110 and the left spool control tube 111 within the outer tube 109. As seen, the right spool control tube 110 is nested within the left spool control tube 111, and the left spool control tube 111 is nested within the outer tube 109. The outer tube 109 also includes a pair of axles, a first axle 113*a* and a second axle 113*b* extending outward from the outer tube 109. The first axle 113*a* is adapted for rotatably mounting the left spool 104*b* thereon. The second axle 113*b* is adapted for rotatably mounting the right spool 104*a* thereon. Each of these axles 113*a*,113*b* passes through a central hole 104*d* of the spools 104*a*,104*b* and the spools 104*a*,104*b* are retained in place using retaining means known in the art. Each of these spools 104*a*,104*b* include a plurality of notches or teeth 104*c* (FIG. 9). The notches 104*c* are seen configured in one particular pattern or orientation, however, it may be possible that these notches 104*c* may be configured in other patterns or orientations.

The left spool control tube 111 comprises a first locking protrusion 111*a*. The left spool control tube 111 may further comprise another protrusion 111*b* extending outward from its closed end 111*c*. The left spool control tube 111 further includes a first stopper 111*d*. The right spool control tube 110 comprises a second locking protrusion 110*a*, and a second stopper 110*b*. In assembly, when, the right spool control tube 110 is nested within the left spool control tube 111, and the left spool control tube 111 is nested within the outer tube 109, the protrusion 110*a* of the right spool control tube 110 emerges or extends out of the second slot 109*c*, and the protrusion 111*b* of the left spool control tube 111 emerges or extends out of the first slot 109*b*.

The right spool control tube 110 is connected to a first control button 115*a* using a first brake rod 116*a*. One end of the brake rod 116*a* is connected to the control button 115*a*, and the other end of the brake rod 116*a* is connected to a distal end of the right spool control tube 110 in proximity to the stopper 110*b* using a first connector 119. The left spool control tube 111 is connected to a second control button 115*b* using a second brake rod 116*b*. One end of the brake rod 116*b* is connected to the control button 115*b*, and the other end of the brake rod 116*b* is connected to a distal end of the left spool control tube 111 in proximity to the stopper 111*d* using a second connector 118. The break rods 116*a*,116*b* are bent at an angle. In an embodiment, the break rods 116*a*, 116*b* may be bent at midway of their length. In another embodiment, the break rods 116*a*,116*b* may be bent at any other locations along their length. The break rods 116*a*,116*b* are connected via a shaft 117 that passes through both the break rods 116*a*,116*b* at a location where the break rods 116*a*,116*b* are bent. The shaft 117 linearly connects the two break rods 116*a*,116*b*. The two break rods 116*a*,116*b* rotate about the shaft 117 when the respective buttons 115*a*,115*b* are pressed. In operation, each of the control buttons 115*a*, 115*b* are selectively pressed by the pet owner to control the release of leashes 105*a*,105*b* from the dual retractable leash 100 during use. Upon pressing the button 115*a*,115*b*, the corresponding break rods 116*a*,116*b* rotate about the shaft 117 clockwise moving the right spool control tube 110 or the left spool control tube 111 forward, which disengages the protrusion 110*a* or the protrusion 111*a* of the tubes 110,111 from the notch 104*c* where the protrusions 110*a*,111*a* are engaged. This unlocks the release of the corresponding leashes 105*a*,105*b*. Next, upon releasing the button 115*a*, 115*b* (depressing), the corresponding break rods 116*a*,116*b* rotate anticlockwise to regain their neutral positions or resting positions, moving the right spool control tube 110 or the left spool control tube 111 backward, which reengages the protrusion 110*a* or the protrusion 111*a* of the tubes 110,111 with one of the notches 104*c* (of the corresponding spools 104*a*,104*b*).

The housing 101 further comprises a first spring 114*a* and a second spring 114*b*. The first spring 114*a* is disposed or extends between the closed end 111*c* of the left spool control tube 111 and an intermediate shaft 113*c* disposed inside the housing 101 along the same axis as that of the axles 113*a*,113*b*. The second spring 114*b* is disposed or extends between a distal end of the outer tube 109 and the stopper 111*d* of the left spool control tube 111. The protrusion 111*b* of the left spool control tube 111 is received within the first spring 114*a*. This protrusion 111*b* helps keep the left spool control tube 111 and nested tube 110 stable within the housing 101. Further, there may be a third spring (not seen) disposed between a distal end of the left spool control tube 111 and the stopper 110*b* of the right spool control tube 110. These springs help control buttons 115*a*,115*b* regain their resting or neutral positions after a pet owner releases the buttons 115*a*,115*b*. These springs also help the tubes 110,111 in making resistive movements forward when the pet owner presses the respective control buttons 115*a*,115*b*.

The dual-retractable pet leash 100 may employ at least one battery (not seen in figures) useful for switching the flashlight 120 ON/OFF. The battery may be rechargeable battery.

Referring to FIGS. 12-15, which specifically show and describe the use case scenario and operation of dual-retractable pet leash 100 while walking two dogs 401,402. A pet owner 300 can hold the dual-retractable pet leash 100 using the handle 103. While walking the two dogs 401,402, the owner 300 ties the retractable leash 105*a*,105*b* to pet dogs 401,402 (the carabiner 121 are attached to the collars of dogs as seen), and a distance between the dog and the owner can be controlled by releasing or retracting the leashes 105*a*, 105*b* with respect to the housing 101 according to a desired distance between the owner 300 and the pets 401,402, so that the dogs 401,402 only move within a designated area around the owner 300.

In operation, while walking the dogs 401,402, when the dogs 401,402 try to cross each other, then the front panel 107 rotates, preventing tangling of the two leashes 105*a*,105*b*. The entire tubular leash assembly that resides inside (discussed above) spins clockwise or anticlockwise depending upon which dog moves on which side. The rotation of the entire leash assembly (components inside the housing) inside is facilitated by the two bearing wheels 108,112 as described earlier in the description. This feature allows the entire mechanism inside the housing 101 to rotate preventing tangling of the leashes 105*a*,105*b* that essentially minimizes the effect each pet may have on each other, and the owner 300 holding the leash assembly 100 in the natural course of the invention's use.

Figure 12:
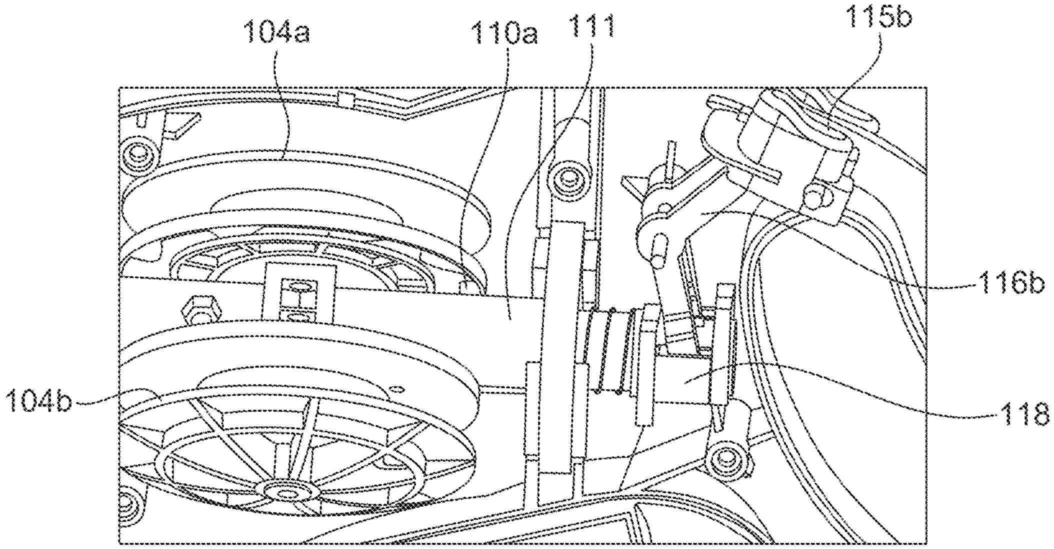
FIG. 12 is a partial sectional view of major components configured with the housing, specifically showing the right spool in a locked state while the respective right control button remains depressed.
Figure 13:
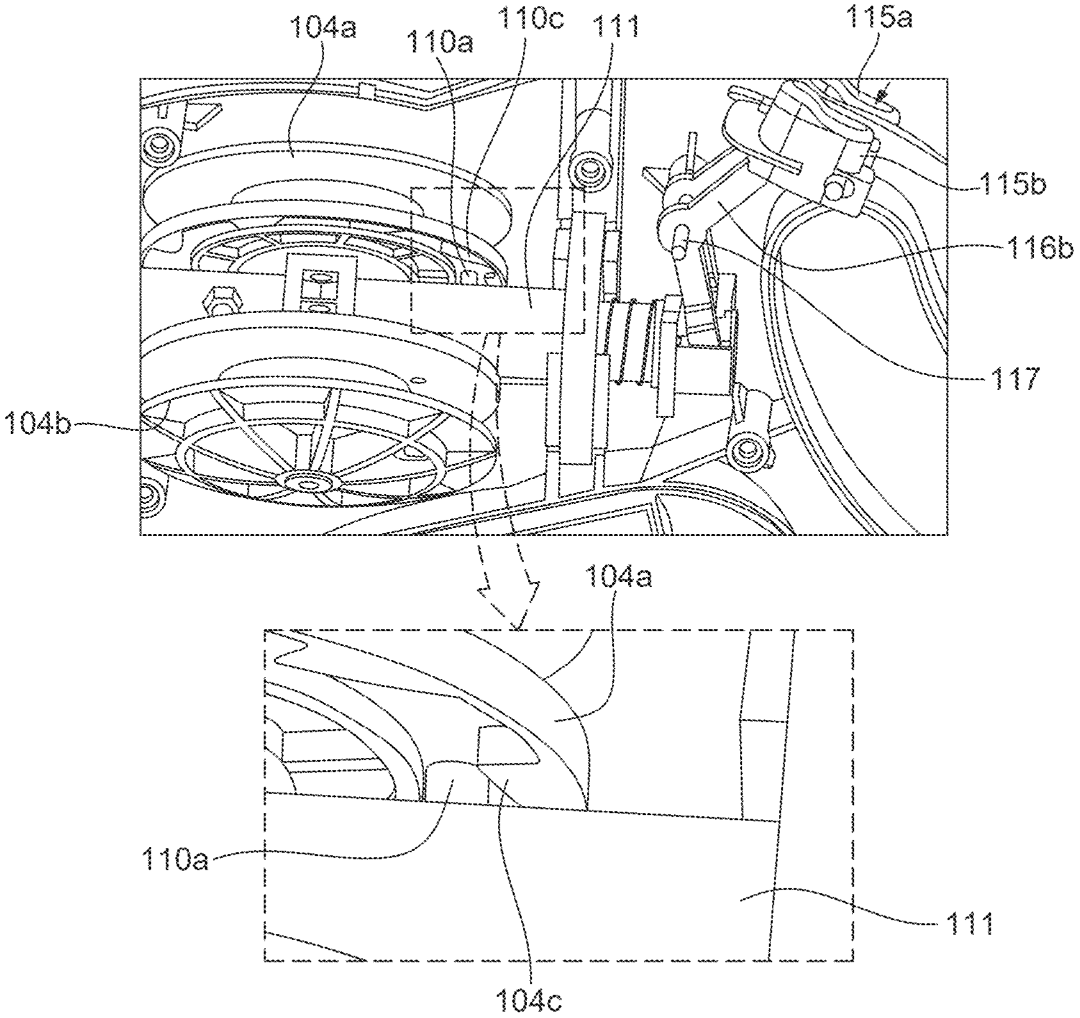
FIG. 13 is a partial sectional view of major components configured with the housing, specifically showing the right spool in an unlocked state while the respective right control button is pressed. A section of the figure is enlarged to show a shaft of the right spool control tube disengaged from the right spool.

Further, when the owner 300 is just holding the leash assembly without pressing any of the control buttons 115*a*, 115*b*, the two leashes 105*a*,105*b* wound around their respective spools 104*a*,104*b* do not get released out of the spools 104*a*,104*b* since the spools 104*a*,104*b* remain in locked position as seen in FIG. 12. This means if the dogs 401,402 try to run ahead demanding release of leashes 105*a*,105*b*, the leashes 105*a*,105*b* do not get released. If the owner of the pet 300 intends to release the leash 105*a* tied to the dog 401, then the owner 300 needs to press the control button 115*a*. When the control button 115*a* is pressed, the breaking rod 116*a* rotates clockwise about the shaft 117 thereby pushing the right spool control tube 110 in a forward direction against the resistance of the spring. The right spool control tube 110, when moved forward moves the protrusion 110*a* away from the notch 104*c* of the spool 104*a* (in a disengaged position), thereby unlocking the spool 104*a* as seen in FIG. 13. When the right spool 104*a* is unlocked, the dog 401 can move free to move forward or pull the leash 105*a* forward (unwind the leash 105*a*) from the spool 105*a*. Again, when the owner releases the pressed button 115*a*, the right spool control tube 110 moves backward to its initial position reengaging the protrusion 110*a* with a notch 104*c* (one of the notches) of the right spool 104*a* (in an engaged position) as seen in FIG. 12.

Figure 14:
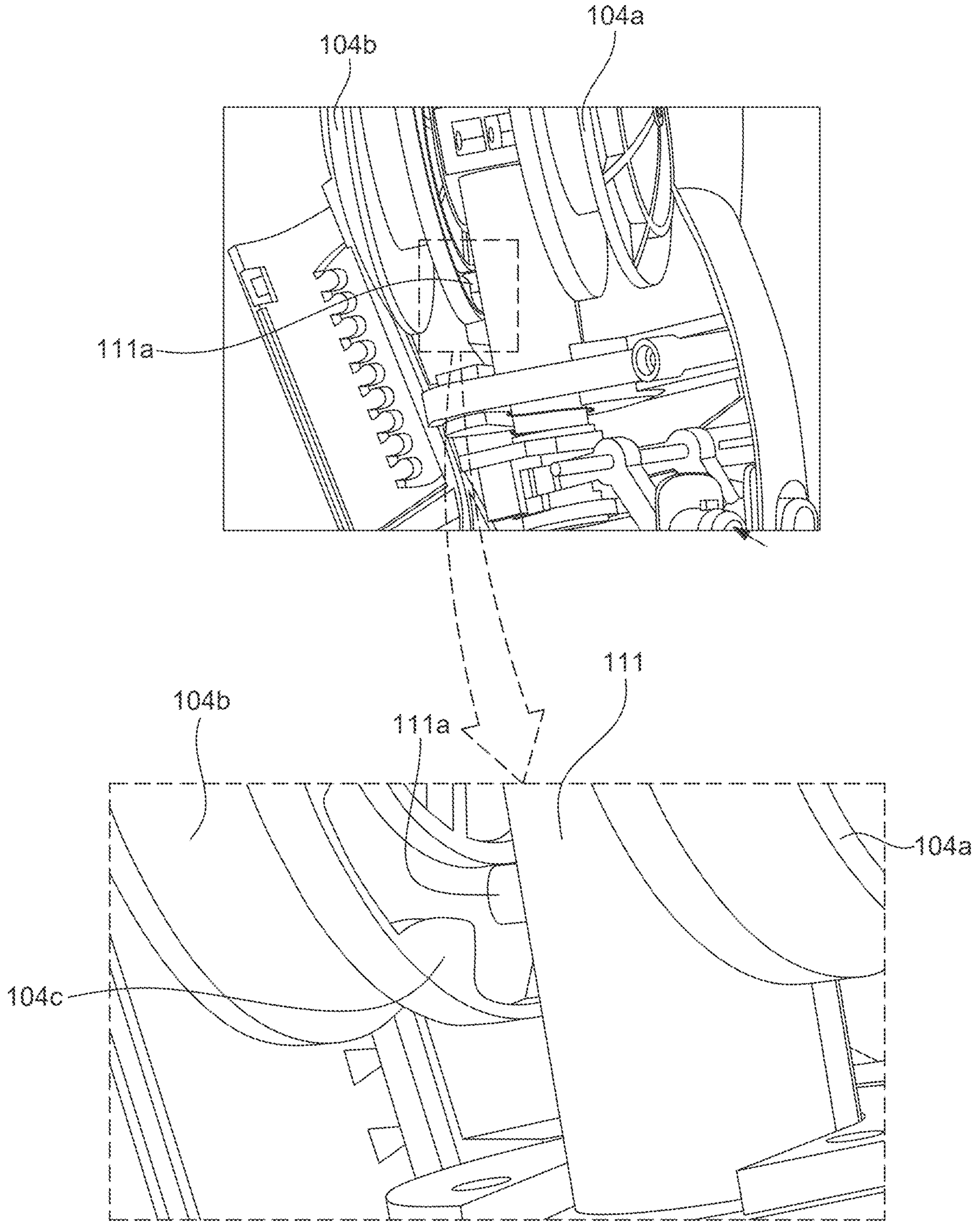
FIG. 14 is a partial sectional view of major components configured with the housing, specifically showing the left spool in an unlocked state while the respective left control button is pressed. A section of the figure is enlarged to show a shaft of the left spool control tube disengaged from the left spool.
Figure 15:
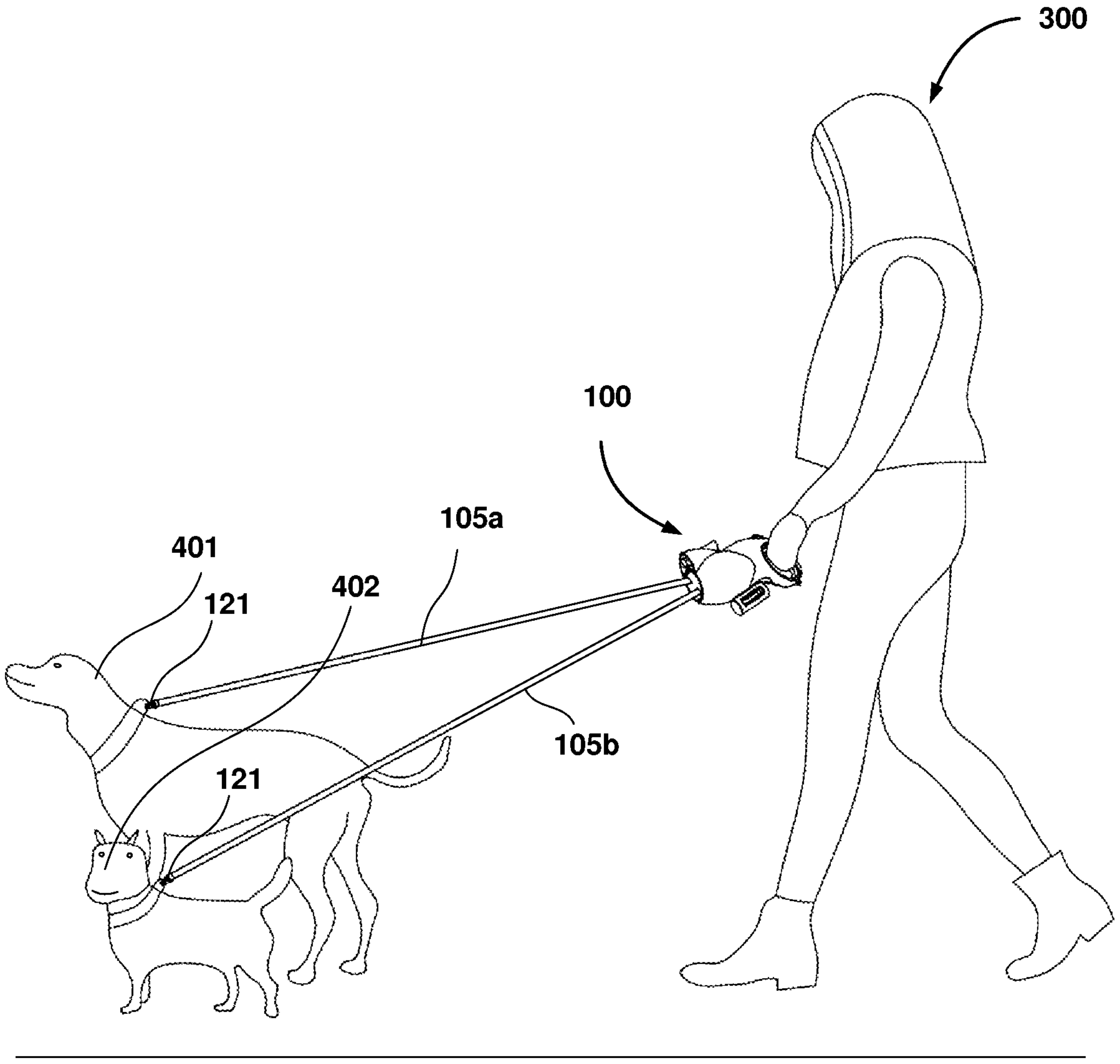
FIG. 15 shows a pet owner holding the dual leash system of FIG. 1 in the natural course of the invention's use.

Likewise, if the owner 300 have to control release of leash 105*b* for the dog 402 then the owner has to press the control button 115*b* which in turn would rotate the breaking rod 116*b* in clockwise about the shaft 117 thereby pushing the left spool control tube 111 in a forward direction against the resistance of the spring 114*a*. The left spool control tube 111, when moved forward, moves the protrusion 111*a* away from the notch 104*c* of the spool 104*b* (in a disengaged position), thereby unlocking the spool 104*b* as seen in FIG. 14. When the left spool 104*b* is unlocked, the dog 402 can move free to move forward or pull the leash 105*b* forward (unwind the leash 105*b*) from the spool 105*b*. Again, when the owner releases the pressed button 115*b*, the left spool control tube 111 moves backward to its initial position reengaging the protrusion 111*a* with one of the notches 104*c* of the left spool 104*b* (in an engaged position) as seen in FIG. 12. The owner 300 is facilitated to use the flashlight 120 provided on the housing 101. The owner can push the button 120*c* to turn on the light and press again to switch off the light. The owner 300 is also provided with integrated poop bag container 106 to help the owner 300 to use the poop bags to collect dog's poop, if any of the dogs do poop while walking to keep the surrounding clean. The owner 300 is able to control the two dogs 401,402 as per his choice. Even if needed, the leash assembly 100 may be used by the owner to control just a single dog if he intends to walk a single dog. Further, the leash assembly 100 is designed in a way that allows the owner 300 to either individually control the leashing mechanism for either of two dogs or if the owner 300 wants, he can even simultaneously operate leashing for both the dogs by simultaneously pressing both the buttons 115*a*,115*b*.

The housing 101 of the dual retractable leash assembly 100 as described above is formed using two symmetrical sections that removably engage with each other with the possibility of attaching the flashlight 120, and the poop bag container 106 as an add on accessory. It should be understood that the housing 101 may be made as one single unit or mold (as described above). It is also possible that the housing may be made using a plurality of parts, say four parts. Likewise, the poop bag container 106 and the light 120 may be formed as a single mold with the housing instead of being external add on accessory as may be appreciated by those skilled in the art. The housing 101 may be formed in different aesthetic appearances and in different sizes using different materials. Further, the mechanism may further employ more or less number of springs inside for more precise and controlled movement of the tubes inside.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A dual-retractable pet leash assembly (100) adapted for walking and restraining two pets (401,402), comprising:

- a housing (101) comprising a front main body portion (102), and a rear handle portion (103) with an opening (103*a*) to allow gripping of the rear handle portion (103), wherein the housing (101) comprises:
  - a right spool (104*a*), and a left spool (104*b*) rotatably disposed within the front main body portion (102) of the housing (101), wherein the right spool (104*a*) and the left spool (104*b*) having a first leash (105*a*), and a second leash (105*b*) secured thereto;
  - a front panel (107) integrated with a first bearing wheel (108) rotatably connected to an outer tube (109) residing within the housing (101);
  - a right spool control tube (110), and a left spool control tube (111), wherein the right spool control tube (110) is slidably nested within the left spool control tube (111), and the left spool control tube (111) is slidably nested within the outer tube (109);
  - wherein, the right spool control tube (110) is connected to a first control button (115*a*) using a first brake rod (116*a*), and the left spool control tube (111) is connected to the second control button (115*a*) using a second brake rod (116*a*);
  - wherein the first control button (115*a*), when pressed, pushes the right spool control tube (110) forward, thereby disengaging a second locking protrusion (110*a*) of the right spool control tube (110) engaged with one of a plurality of notches (104*c*) of the right spool (104*a*), and the first control button (115*a*), when released, retracts the right spool control tube (110) backward, thereby reengaging the second locking protrusion (110*a*) of the right spool control tube (110) with one of the plurality of notches (104*c*); and wherein the second control button (115*b*), when pressed, pushes the left spool control tube (111) forward, thereby disengaging a first locking protrusion (111*a*) of the left spool control tube (111) engaged with one of the plurality of notches (104*c*) of the left spool (104*b*), and the second control button (115*b*), when released, retracts the left spool control tube (111) backward, thereby reengaging the first locking protrusion (111*a*) of the left spool control tube (111) with one of the plurality of notches (104*c*).

2. The dual-retractable pet leash (100) of claim 1 further comprising an integral light (120) mounted on the front main body portion (102) of the housing (101).

3. The dual-retractable pet leash (100) of claim 1 further comprising an integral poop bag container (105) configured for holding one or more pet poop bags.

4. The dual-retractable pet leash (100) of claim 1, wherein the front panel (107) comprises a first leash passage (107*a*) and a second leash passage (107*b*), through which pass the first leash (105*a*) and the second leash (105*b*), respectively.

5. The dual-retractable pet leash (100) of claim 1, wherein the right spool (104*a*) and the left spool (104*b*) are rotatably mounted on a first axle (113*a*) and a second axle (113*b*) extending outward from the outer tube (109).

6. The dual-retractable pet leash (100) of claim 1 further comprising a second bearing wheel (112) located within the housing (101) adapted for supporting the rotation of the front panel (107) and the first bearing wheel (108) assembly.

7. The dual-retractable pet leash (100) of claim 1, wherein the first bearing wheel (108) is embodied within a first groove (102*k*) formed by a pair of first supporting members (102*j*), and the second bearing wheel (112) is embodied within a second groove (102*i*) formed by a pair of second supporting members (102*h*) to be stable during use.

8. The dual-retractable pet leash (100) of claim 1, wherein the first brake rod (116*a*) and the second brake rod (116*b*) are bent at an angle and are interconnected by a linear shaft (117) to rotate about the linear shaft (117).

9. The dual-retractable pet leash (100) of claim 1 further comprising:

a first spring (114*a*) disposed between a closed end (111*c*) of the left spool control tube (111); an intermediate shaft (113*c*), the intermediate shaft defining a shaft axis; wherein the first axle (113*a*) and the second axle (113*b*) are disposed along the shaft axis inside the housing;

a second spring (114*b*) disposed between a distal end of the outer tube (109) and a first stopper (111*d*) of the left spool control tube (111); and a third spring disposed between a distal end of the left spool control tube (111) and the stopper (110*b*) of the right spool control tube (110).

10. The dual-retractable pet leash (100) of claim 1, wherein the first spring (114*a*) receives a protrusion (111*b*) extending outward a closed end (111*c*) of the left spool control tube (111).

11. The dual-retractable pet leash (100) of claim 1, wherein the housing (101) is formed using a left section (102*a*), and a right section (102*b*) that removably engage with each other using a first interlocking feature (102*d*), and a second interlocking feature (102*c*), respectively.

12. The dual-retractable pet leash (100) of claim 2, wherein a bottom (120*a*) of the integral light (120) comprises one or more locking features (120*b*) that snap fit into one or more grooves (102*e*) located on the front main body portion (102) of the housing (101) to lock the integral light (120) over the front main portion (102).

13. The dual-retractable pet leash (100) of claim 1 further comprising a connecting tab (103*b*) that includes an opening to facilitate connecting one or more accessories comprising at least a retractable key chain for holding keys, and a hanging tag.

14. The dual-retractable pet leash (100) of claim 1, wherein a length of the right spool control tube (110) is greater than a length of the left spool control tube (111).

15. The dual-retractable pet leash (100) of claim 1, wherein a proximal end of the outer tube (109) is connected to the first bearing wheel (108) using a fastener that passes through a fastening hole (108*c*) located on the first bearing wheel (108) and a hole (109*a*) located inside the outer tube (109).

16. The dual-retractable pet leash (100) of claim 1, wherein the second locking protrusion (110*a*) of the right spool control tube (110) extends out of a second slot (109*c*) of the outer tube 109, and the first locking protrusion (111*a*) of the left spool control tube (111*a*) extends out of the first slot (109*b*) of the outer tube (109*c*).

17. The dual-retractable pet leash (100) of claim 1, wherein a first end of the first brake rod (116*a*) is connected to the first control button (115*a*), and a second end of the first brake rod (116*a*) is connected to a distal end of the right spool control tube (110) in proximity to a stopper (110*b*) using a connector (119).

18. The dual-retractable pet leash (100) of claim 1, wherein a first end of the second brake rod (116*b*) is connected to the second control button (115*b*), and a second end of the second brake rod (116*b*) is connected to a distal end of the left spool control tube (111) in proximity to a stopper (111*d*) using a connector (118).

* * * * *